(12) United States Patent
Fabritius

(10) Patent No.: US 7,272,790 B2
(45) Date of Patent: Sep. 18, 2007

(54) METHOD AND DEVICE FOR AUTOMATICALLY SELECTING A FRAME FOR DISPLAY

(75) Inventor: Henna Fabritius, Tampere (FI)

(73) Assignee: Nokia Corporation (FI)

( * ) Notice: Subject to any disclaimer, the term of this patent is extended or adjusted under 35 U.S.C. 154(b) by 381 days.

(21) Appl. No.: 10/794,803

(22) Filed: Mar. 5, 2004

(65) Prior Publication Data

US 2005/0216858 A1  Sep. 29, 2005

(51) Int. Cl.
G06F 15/00 (2006.01)
G06F 17/00 (2006.01)

(52) U.S. Cl. ............... 715/520; 715/513; 715/517; 715/521; 715/526

(58) Field of Classification Search ........... 715/520, 715/513, 517, 521, 526
See application file for complete search history.

(56) References Cited

U.S. PATENT DOCUMENTS

| | | | | |
|---|---|---|---|---|
| 5,001,571 A | | 3/1991 | Murano | 358/434 |
| 5,469,540 A | * | 11/1995 | Powers et al. | 715/500.1 |
| 5,602,996 A | * | 2/1997 | Powers et al. | 715/807 |
| 5,828,374 A | * | 10/1998 | Coleman et al. | 715/786 |
| 5,903,267 A | * | 5/1999 | Fisher | 715/786 |
| 6,421,062 B1 | | 7/2002 | Higashio | 345/634 |
| 6,593,944 B1 | | 7/2003 | Nicolas et al. | 345/744 |
| 6,825,860 B1 | * | 11/2004 | Hu et al. | 715/801 |
| 6,832,353 B2 | * | 12/2004 | Itavaara et al. | 715/744 |
| 6,950,993 B2 | * | 9/2005 | Breinberg | 715/801 |
| 6,955,298 B2 | * | 10/2005 | Herle | 235/472.01 |
| 6,976,226 B1 | * | 12/2005 | Strong et al. | 715/788 |
| 6,983,331 B1 | * | 1/2006 | Mitchell et al. | 709/246 |
| 2002/0002635 A1 | * | 1/2002 | Astala et al. | 709/328 |
| 2002/0095475 A1 | * | 7/2002 | Krothapalli et al. | 709/217 |
| 2002/0123878 A1 | * | 9/2002 | Menke | 704/2 |
| 2002/0186257 A1 | * | 12/2002 | Cadiz et al. | 345/838 |
| 2003/0011631 A1 | * | 1/2003 | Halahmi | 345/744 |
| 2004/0090463 A1 | * | 5/2004 | Celik et al. | 345/767 |
| 2004/0133848 A1 | * | 7/2004 | Hunt et al. | 715/500 |
| 2004/0212640 A1 | * | 10/2004 | Mann et al. | 345/792 |
| 2005/0010594 A1 | * | 1/2005 | Chen et al. | 707/104.1 |
| 2005/0021851 A1 | * | 1/2005 | Hamynen | 709/245 |
| 2005/0132286 A1 | * | 6/2005 | Rohrabaugh et al. | 715/523 |
| 2005/0177798 A1 | * | 8/2005 | Thomson et al. | 715/788 |
| 2006/0206832 A1 | * | 9/2006 | Celik et al. | 715/767 |

OTHER PUBLICATIONS

Mozilla, Bug 86931, Mar. 11, 2003, Bugzilla, pp. 1-3.*
Minimo, Minimo Project, Feb. 18, 2004, Mozilla.*

* cited by examiner

*Primary Examiner*—Doug Hutton
*Assistant Examiner*—N Hillery

(57) ABSTRACT

The present invention relates to the display of multi-frame-based information on devices such as mobile terminal devices, wherein a possible definition of "a frame" is a display area of an application that is scrollable, if the whole content can not be displayed at once. More specifically, the present invention relates to a method and a device to select one or more frames of a plurality of received or retrieved frames to be displayed as an active frame. The method comprises determining for each frame the total data content and the displayed data content, calculating for each of said frames a ratio of said determined data content and said determined displayed data content, and selecting the frame with the largest ratio for display as an active frame.

14 Claims, 2 Drawing Sheets

--- determining for each of said frames the total data content and the displayed data content  42

↓ calculating for each of said frames a ratio of said data content and said displayed data content  44

↓ selecting said frames with the largest ratio to be displayed as an active frame  46

METHOD AND DEVICE FOR AUTOMATICALLY SELECTING A FRAME FOR DISPLAY

FIELD OF THE INVENTION

The present invention relates to the display of multi-frame-based information on devices such as mobile terminal devices. A possible definition of "a frame" is a display area of an application that is scrollable, if the whole content can not be displayed at once. More specifically, the present invention relates to a method and a device to select one or more frames of a plurality of received or retrieved frames to be displayed as an active frame.

BACKGROUND OF THE INVENTION

The frames are an important method for presenting information. An example is the HTML standard, wherein nearly all the browser implementations support frames. A frame is a design solution used for example in web browsers that allows the web page designer to split the web browser view or window into several areas, each of which can independently show the content of a specific HTML page. This design solution is often used to define permanent areas on the top or at the left side of the view/window for navigational elements, such as links, so that browsing of the web page content can be centralized to one main frame. According to the HTML language, the web page designer can define the size of the frames either in percentages of the size of the whole view or window, or in a number of pixels. Frames are usually used such that one frame displays the navigational information (hyperlinks). This frame is usually on the upper or left side of the page. In the right hand side there is a bigger frame, which contains the actual information of the page. Most conventional browsers, Netscape™ and Internet Explorer™, do not set the active frame automatically, but the user has to select a frame to activate it.

In the recent time the frame support has also been applied to browsers of mobile devices. Web pages that have been designed for large PC screens are often cumbersome in devices with small screens. Reading a web page on a small display may require many scrolling input operations. In mobile devices the selection of an active frame is not as easy as in desktop computers. Thus, the usability of the browser would increase if the active frame were selected automatically. Pages with frames are particularly difficult to handle in small screen devices, as each frame needs to be scrolled separately, and if the frames do not fit to a small display, the view is full of small, framed areas with tiny scroll bars.

A standard web browser typically focuses (i.e. selects as active) by default on the top-left frame. Therefore, if the user tries to scroll the pages with scroll keys, the top-left frame of the page starts scrolling. However, this frame usually shows a small HTML page with a couple of links, and scrolling does not provide any benefit to the user. Another approach used for example in the browser of the Nokia Communicator is to automatically select the biggest frame as the active frame.

In order to scroll through the main content of a framed page, the user has to find out which is the frame that contains most interesting content, which is not very easy to find out as all of the frames are small, and the user has to move the focus to that frame. Up to now, there is no easy shortcut for moving the focus from one frame to another, such as with a touch screen or mouse oriented device, the user needs to tap the right frame in order to scroll it. This makes navigation slow and inefficient.

All the above approaches for setting a focus on a certain frame of received multi-frame data have in common that they are not suitable for the use with mobile terminal devices as mobile phones, or handheld computers due to the small displays or screens used in these portable devices.

It is therefore desirable to have a method and a device to simplify the use of frame based information in a mobile terminal based environment without the restrictions caused by reduced display sizes and reduced user input interfaces.

It is further desirable to have a browser architecture that is capable of reducing these problems.

SUMMARY OF THE INVENTION

According to a first aspect of the present invention, there is provided a method for automatically selecting a frame to be displayed as an active frame on a terminal device. The method comprises determining the amounts of the total data content and of the displayed or visible data content, for each frame, followed by calculating a ratio of said data content and said displayed data content for each frame, and selecting the frame with the largest ratio to be displayed as an active frame.

By determining for each of said frames the total amount of data contained and the amount of displayed or visible data content, the properties and the characteristics of each frame is made accessible.

By calculating for each of said frames the ratio of said total data content and said displayed data content as an indicator for the "scrollability" of each of said frames is calculated. The scrollability may also be defined as a value that is inversely related to the actual visibility of a frame, i.e. a value that indicates how much of the total content is actually visible in the frame. If e.g. the whole content is depicted in a frame it is usually not possible to scroll this frame.

By selecting said frame with the largest ratio to be displayed as an active frame, that frame is selected as the active frame that comprises the most "relatively" hidden information and which thus a user may need to scroll the most. The provided method sets the focus automatically to the frame that shows least of its content, if more than one frame is to be displayed.

It may be noted that the method of the present invention can be used for any kind of programs and applications that use frames.

The user benefits from the invention in that when opening multi frame data such as e.g. a web page, the frame that the user is most likely to scroll is automatically activated or selected. Thus, the user does not need to select a frame by tapping the view, but can instantaneously use the scroll keys to navigate in the activated frame.

An example embodiment of the present invention further comprises selecting at least one of said frames with the largest ratio to be displayed as an active frame, if more than one of said frames are calculated with the same largest ratios. This selection can be based on a random selection or can be based on the position of the frames or even on the size of said frames. It is also possible to activate two frames to be scrolled in parallel.

Another example embodiment of the present invention further comprises re-scaling of said frames to a normalized frame size prior to determining said data content. Thereby, the size of frames and of the text (e.g. Pica 9 and a 2-inch frame size) can provide a kind of normalized frame size and therefore a normalized frame content. This is especially useful if e.g. an automated scaling function ensures that a text in a frame is definitively readable. This feature is also useful, if all non-active windows are automatically suppressed i.e. not displayed. Thereby it can be assured that a re-sized and re-scaled frame or window is always a "scrollable" window. Thereby it can be prevented that the re-sized and re-scaled frame or window is no longer scrollable due to the re-scaling.

Yet another example embodiment of the present invention further comprises pre-sorting and pre-selecting said frames, prior to determining said data content. Yet another example embodiment of the present invention further comprises re-coding said frames, prior to determining said data content. Thereby a comparable basis for the usually different frames with usually different content can be generated. A comparable data content can be derived even from frames with different types of data e.g. to be able to compare the data content of e.g. an ASCII text file with bitmap data, picture data or compressed data.

Another example embodiment of the present invention further comprises suppressing the displaying of the frames with the smallest ratios. The information on the frames with most content could be utilized in other ways in the user interface as well, like by emphasizing the active frame visually, expanding the frame size, allowing the user to view only the frame with most content. The not selected frames can be suppressed in size, color or displaying.

Another example embodiment of the present invention further comprises sorting said frames for display according to said calculated ratios. The information on the frame with most content could be utilized in other ways in the user interface (UI) as well, like by emphasizing the frame visually, expanding the frame size, allowing the user to view only the frame with most content. In this case a user can e.g. toggle the focus from one window to the next one, in the sequence of a decreasing content ratio.

In yet another example embodiment of the present invention, a browser program performs said method. Especially, although not limited thereto, the present invention can be applied to Internet or WEB browsers to automatically depict or move the focus to the frame with the highest scrollability. It should be noted that the method can be also used any kind of programs that use frames.

In another example embodiment of the present invention, the method further comprises receiving at least two frames for display. The at least two frames to be displayed may be received from a storage, from a server or from another arbitrary data source. The data source can provide the data e.g. as an HTML (Hypertext Markup Language) or XML (Extensible Markup Language) page provided with different frames. The data source can provide the data e.g. as a WML (Wireless Markup Language) page provided with different frames.

According to yet another aspect of the invention, a software tool is provided comprising program code means for carrying out the method of the preceding description when said program product is run on a device.

According to another aspect of the present invention, a computer program product for carrying out the method of the preceding description is provided, which comprises program code means for performing all of the steps of the preceding methods when said program is run on a device.

According to yet another aspect of the present invention a terminal device capable of automatically selecting a frame to be displayed as an active frame is provided. The terminal device comprises a data interface configured to access frames, a central processing unit, a display, a user interface, and an evaluation component.

In the terminal said central processing unit is connected to said data interface, and to said display, respectively. Said data interface is configured to receive data representing data frames, and said central processing unit is configured to provide said display unit with data that can be displayed. The evaluation component is connected to said central processing unit. Said evaluation component is configured to determine for each received frame the total amount of data content and amount of the displayed or visible data content. Said evaluation component is further configured to calculate for each of said frames a ratio of said total data content relative to said displayed data content, and to control said central processing unit to select said frames with the largest ratio to be displayed as an active frame. That is the present invention further provides a terminal that comprises components to enable the terminal to perform the methods disclosed in the preceding description.

In another example embodiment of the terminal device said terminal device is a mobile terminal device, such as a portable palmtop computer or a mobile visual display unit.

An example embodiment of said terminal device further comprises a cellular telephone. Another example embodiment of said terminal device further comprises a personal digital assistant. Especially in a terminal application with the extremely restricted display sizes the present invention can be used to optimize the access to frame based information.

In yet another example embodiment of the terminal device said data interface is provided by a web browser, a wired interface, or a radio interface to a communication network. The present invention can provide an optimized access to the usual data format of the Internet, which may help to encourage a more general acceptance of mobile Internet access.

BRIEF DESCRIPTION OF THE DRAWINGS

In the following, the invention will be described in detail by referring to the enclosed drawings in which.

DETAILED DESCRIPTION OF THE DRAWINGS

Figure 1:
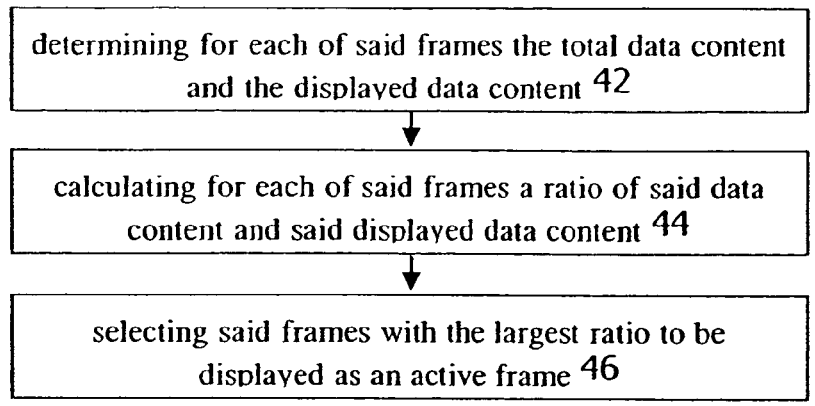
FIG. 1 is a flowchart of a method for selecting an active frame according to one aspect of the present invention.

FIG. 1 is a flowchart of a method for selecting an active frame according to one aspect of the present invention. When e.g. a web page is opened, that contains more than one frame it may be helpful for a user if the frame is activated that is most likely to be scrolled by a user. This feature would simplify the use of mobile terminal devices especially for browsing web pages, as user is relieved from the task to enter a complicated "activate frame" input.

The method determines for each of said frames the total data content and the displayed data content 42. This may be implemented by a web browser (or a specific evaluation component) that counts the size of each frame in pixels, and the size of each HTML page that by default opens to the frame in question. It is also possible to determine e.g. an amount of contained and/or displayed ASCII characters as another possible example.

Subsequently for each of said frames the ratio of said total data content and said displayed/visible data content is calculated. That is the browser counts which of the frames is the smallest, (i.e. shows least of its content,) in proportion to the size of the HTML page opening to it.

Subsequently, the frame with the largest ratio (i.e. the one showing the least of its content) is displayed as active frame i.e. the browser places the focus by default to the frame in question.

Thus, when a user opens the web page, the focus is automatically in the frame that the user is most likely to scroll to anyway. The present invention is based on the idea that the frame that is most likely to be scrolled to is the frame that has the most scrollable content. If this estimation is correct, the user need not perform any frame selecting input, but can use the scroll keys to navigate in the frame.

The present invention can also be performed if only a single frame is present for display or a single frame is received, but in this case, this would result in a selection of the only received frame as the active frame.

The method may be extended by a step of receiving at least two frames to be displayed prior to determining the total data content and the displayed data content for each of said (received) frames. The frames may be received or retrieved from a memory device or from a remote server.

Figure 2:
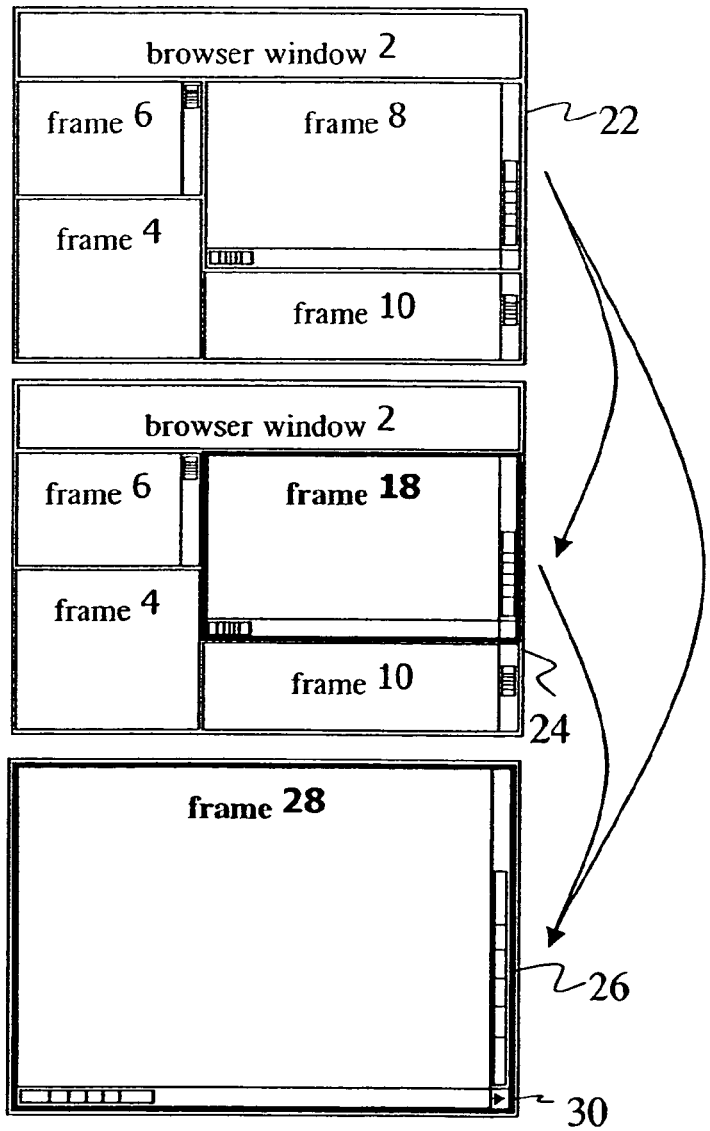
FIG. 2 represents different display contents to visualize the effects of the present invention.

FIG. 2 represents different depicted display contents to visualize the effects of the present invention. This invention proposes a method to find out the most relevant frame among a number of frames. The method that the invention proposes is the following: When opening a page or a browser window 2 containing frames 4, 6, 8, and 10, the browser application calculates the size of each frame 4, 6, 8, and 10 (in pixels or some other units). When depicted on a standard display 22 without using the present invention a standard browser window 2 would open a number of frames 4, 6, 8, and 10. In the presented case the frame 4 shows all of its content as can be recognized by the fact that no scroll bar is depicted. The frame 6 shows approximately a fifth of its content as can be recognized by the extension of the scroll box located on the right side of the frame 6. The frame 10 shows approximately a tenth of its content as can be recognized by the extension of the scroll boxes located in the scroll bars located on the right side and the bottom of the frame 8. The frame 8 shows approximately a third of its content.

The device or (e.g. the browser application) calculates the size of each content loaded in frames 4, 6, 8, and 10 (for example in kilo byte of html file and all other files that is included (pictures, other html files, etc.) or in other units). The calculations that are made to determine the size of scroll bars might provide the needed information: the window that comprises the most content that can be scrolled also shows the shortest scrolling box in the scrolling bar. Following that, the browser calculates which of the frames 4, 6, 8, and 10 shows least of its content and activates that frame (here frame 8) automatically.

The information that the frame with most content could be utilized in other ways in the depicted user interface as well, like by visually emphasizing the frame, expanding the frame size, allows the user to view only the active frame.

To indicate that frame 8 is selected as an active frame depicted in the display representation 24 the frame is depicted in a highlighted way as the frame 18 depicted in bold lines. The numbering the other frames 4,6, and 10 stays unchanged.

It is also possible to expand the frame size of the selected frame 8, allowing the user to view only the frame with most content is selected as an active frame. This situation is shown in the display representation 26 wherein the frame 8 is depicted in a highlighted and expanded manner as the frame 28.

It is also possible re-scale the frame 28 in the display 26 to show the frame only with one scrollbar. A re-scaling procedure could easily be implemented in case of text content. A re-scaling procedure to remove one of said scrollbars enable a user to use a joystick type button to switch between the frames in a sequence following the respective ratio representing values of scrollability in a decreasing succession.

In case of an enlarged frame 28, a small button or icon 30 can be provided (which may be controlled e.g. by the "#" key) in the scrollbar to switch between the (eventually enlarged) frames 2, 4, 6, 10 and 28. It is also possible to use another key in combination to select or toggle the focus from one window to the next one, in the sequence of a decreasing content ratio 2, 4, 6, 10 and 28 and to the whole composite display 22.

Figure 3:
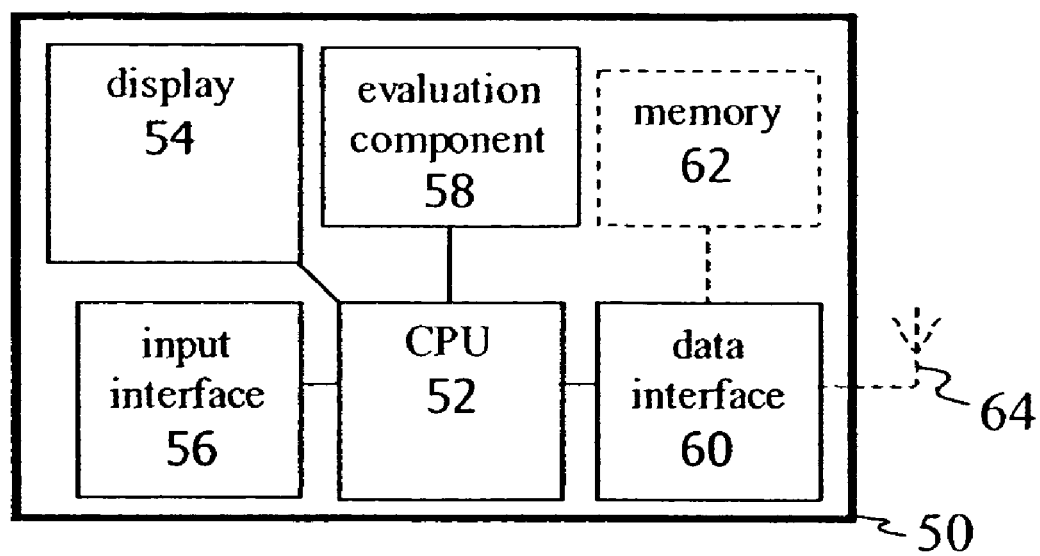
FIG. 3 is an example of a mobile terminal device according to the present invention.

FIG. 3 is an example of a mobile terminal device according to another aspect of the present invention. The mobile terminal device 50 is capable of automatically selecting a frame to be displayed as an active frame, as described in the preceding description. The mobile device 50 comprises a data interface 60 configured to be connected to a data source 62 or 64. Said data interface 60 is configured to receive or retrieve data that represent data frames such as known from Internet pages, web sites, and the like. Thus, the data source can be a server connected via a communication network or internal data storage 62 of the mobile terminal. The mobile terminal can also be just a reader device to access stored data provided in a frame-based data structure.

The central processing unit 52 can be adapted to run a browser application to enable a user interaction with the frame-based data and serves to provide a display unit 54 connected to said CPU 52 with frame based data.

The device is also provided with a user interface 56 to enable user interaction to access the data provided in the frames, i.e. enable a user to browse.

The mobile terminal device is further provided with an evaluation component 58 that is connected to said central processing unit 52.

Said evaluation component 58 is configured to determine for each received frame the amount of the data contained in said frame and an amount of data that is displayed (i.e. visible) in said frame. The evaluation components further configured to calculate the ratio of the total data content and the visible data content of each frame. That is, for each frame the ratio that is generated represents a value representing the visibility of the contents. The less content that is visible, the more intensively a user must scroll in a frame. I.e. the visibility and the scrollability represent basically inversely related values.

Said evaluation component 58 is further configured to control said central processing unit 52 to select said frames with the largest ratio to be displayed as an active frame.

The active frame can be displayed as indicated in FIG. 2 as a highlighted frame or a frame that is emphasized by a different color or by animation.

It may also be possible to implement the mobile terminal device with an evaluation component 58 that is implemented in said central processing unit 52. It may also be possible to implement said evaluation component 58 by a software application running on said central processing unit 52.

By using the above method the frame that user most probably wants to read (or scroll) is automatically activated and user can scroll the content easily. The method is also quite easy to implement and does not require extensive computational power. The present invention can improve the user experience of mobile web browser devices.

The present invention provides all elements or components necessary to significantly improve the usability of electronic devices for browsing multi-frame-based data and information sources.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

The invention claimed is:

1. A method comprising:
    automatically selecting a frame in an application or program that has multiple frames, including a web page, to be displayed as an active frame on a display of a terminal device capable of displaying one or more frames or a portion of a frame by:
    determining for each frame a total data content and a displayed data content,
    calculating for said each frame a ratio of said determined total data content and said determined displayed data content,
    selecting the frame with the largest ratio for display as said active frame,
    said determining, calculating, and selecting carried out by an evaluation component of said terminal device connected to a data interface, to a central processing unit, to said display, and to a user interface of said display, wherein said data interface is configured to receive data representing data frames, and said central processing unit is configured to provide said display with data that can be displayed as frames, and
    displaying the selected frame as the active frame on the display.

2. Method according to claim 1 further comprising:
    selecting at least one of said frames with the largest ratio to be displayed as an active frame, if more than one of said frames are determined with a same largest ratio.

3. Method according to claim 1 further comprising:
    re-scaling said frames to a normalized frame size prior to determining said data contents.

4. Method according to claim 1 further comprising:
    pre-selecting text based frames of said frames prior to determining said data contents.

5. Method according to claim 1 further comprising:
    suppressing the displaying of one or more frames with smallest calculated ratios.

6. Method according to claim 1 further comprising:
    sorting said frames for display according to said calculated ratios.

7. Method according to claim 1, wherein said method is performed by a web browser program.

8. Method according to claim 1, further comprising receiving at least two frames for display.

9. Computer program product comprising program code means stored on a computer readable medium for carrying out the method of claim 1, when said program product is run on a device.

10. A terminal device comprising:
    a data interface,
    a central processing unit,
    a display,
    a user interface,
    said central processing unit being connected to said data interface, to said user interface, and to said display,
    said data interface being configured to receive data representing data frames,
    said central processing unit being configured to provide said display with data that can be displayed as frames,
    an evaluation component connected to said central processing unit for automatically selecting a frame in an application or program that has multiple frames, including a web page, to be displayed as an active frame, said evaluation component being configured to determine for each received frame an amount of total data content and a displayed data content, to calculate for each of said frames a ratio of said total data content and said displayed data content, and to control said central processing unit to select frames with a largest ratio
    the display displaying the selected frame as the active frame.

11. Terminal device according to claim 10, wherein said terminal device is a mobile terminal device.

12. Terminal device according to claim 10, further comprising a cellular telephone.

13. Terminal device according to claim 10, further comprising a personal digital assistant.

14. Terminal device according to claim 10, wherein said data interface is a radio interface to a communication network.

* * * * *